An instance of United States Patent Office document.

3,839,461
PROCESS FOR PRODUCING ORGANIC HYDROPEROXIDES

Kazuyoshi Aoshima, Yoshiyuki Hashizume, and Takeshi Komai, Taketoyo, and Kou Kitagawa, Tokai, Japan, assignors to Nippon Oils and Fats Company Limited, Tokyo, Japan
No Drawing. Filed Jan. 20, 1971, Ser. No. 108,135
Claims priority, application Japan, Jan. 22, 1970, 45/5,488
Int. Cl. C07c 73/06
U.S. Cl. 260—610 B      4 Claims

ABSTRACT OF THE DISCLOSURE

Tertiary hydroperoxides having a low coloring and represented by the general formula

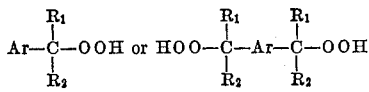

wherein $R_1$ and $R_2$ represent alkyl groups and Ar represents aryl group or aralkyl group are produced in a high yield by oxidizing the alkyl-substituted aromatic hydrocarbons corresponding to the above formula respectively by means of oxygen or air in a homogeneous liquid phase in the presence of an alkali metal salt of trialkylacetic acid having 7 to 19 carbon atoms.

---

The present invention relates to a process for producing tertiary organic hydroperoxides by oxidizing alkyl-substituted aromatic hydrocarbons by oxygen or air in a homogeneous liquid phase.

When the hydroperoxides are produced by oxidizing the above described hydrocarbons by oxygen or air, acidic substances which retard the oxidation reaction, are often produced as a side-reaction. These acidic substances not only retard the main reaction but also decrease pH of the reaction mixture and cause the decomposition and coloring of the hydroperoxides. Heretofore, it has been known to neutralize the acidic substances by means of a base in order to decrease or avoid the influence of the by-produced acidic substances. This process has been used for the production of cumene hydroperoxide, diisopropyl-benzene hydroperoxide and the like, which are particularly sensitive to acids.

For the purpose, carbonates and silicates of alkali or alkaline earth metals, such as sodium carbonate, calcium carbonate, sodium silicate and the like have been generally used and further it has been proposed to use alkali metal salts of fatty acids, such as oleic acid, stearic acid, lauric acid and the like, which are the starting material for soaps. Since any of these substances is insoluble in the reactant, a mechanical stirring is necessary in order to maintain a thorough contact with the material to be oxidized and so the system of the reaction apparatus is limited within a narrow scope. Furthermore, in the reaction of such a dispersion system of solid, undissolved substances adhere to or precipitate in a tube for transferring the reaction mixture and an inlet for the reacting gas and so the progress of the smooth reaction is often retarded. Moreover, if the above described alkali salts of fatty acids, which have been known as soaps, are used, a large amount of foams are formed during the oxidation reaction and therefore the progress of the oxidation reaction is often very difficult.

The present invention is based on the unexpected discovery that the aforementioned disadvantage may be largely avoided by carrying out the oxidation in the presence of alkali metal salts of trialkylacetic acids having 7 to 19 carbon atoms as an additive.

According to the present invention, a process for producing tertiary hydroperoxides having little impurities and low coloring, which have the following general formula

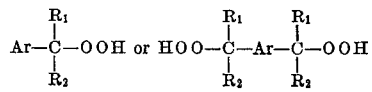

wherein $R_1$ and $R_2$ represent alkyl groups and Ar represents aryl or aralkyl group, comprises oxidizing alkyl-substituted aromatic hydrocarbons which have the following general formula

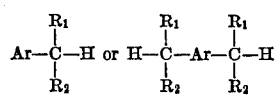

wherein $R_1$, $R_2$ and Ar have the same meanings as described above, by means of oxygen or air in a homogeneous liquid phase at moderately elevated temperature in the presence of alkali metal salts of trialkylacetic acids having 7 to 19 carbon atoms in a short time.

The trialkylacetic acids, which are the starting material for the alkali salts to be used in the present invention, are tertiary fatty acids obtained, for example by reacting a branched olefin, carbon monoxide and water in the presence of an acid catalyst as shown in "Chemistry and Chemical Industry (Japan), 19 67–76 (1966)" and these acids are not necessarily a single compound but may be a mixture of isomers or acids having different carbon numbers.

Said tertiary fatty acids are, for example, neo-heptanoic acid, neo-decanoic acid, neo-tridecanoic acid (these three acids are made by Enjay Co. Ltd.), Versatic-9-acid (56% 2,2,4,4-tetramethyl valeric acid, 27% 2-iso-propyl-2,3-dimethylbutyric acid, 17% the other isomers), Versatic–911 acid (a mixture of tertiary monobasic fatty acids of $C_9$, $C_{10}$ and $C_{11}$), Versatic–1519 acid (a mixture of multi-branched tertiary monobasic fatty acids of $C_{15}$–$C_{19}$) (these Versatic acids are made by Shell Co. Ltd. Trademark) and the like.

Accordingly, the alkali metal salts prepared from these acids by a conventional process are not always single compounds and contain alkali salts of mixed fatty acids, but they may be used in the reaction of the present invention in the mixed state. As alkali salts, potassium salts and sodium salts are useful but the latter is preferable. These salts are generally introduced into the material to be oxidized in a powdery form but may be fed in an aqueous solution. The water is immediately evaporated at the reaction temperature of higher than 100° C.

The alkali metal salts to be used in the present invention are completely dissolved in the reactant at an enhanced temperature and hence it is possible to obtain an accurate amount to be used and to disperse the salt into the reaction mixture homogeneously. In the oxidation reaction when using these salts, the formation of foams is few as compared with the case when alkali salts of fatty acids which are known as usual soaps, are used. These facts are very advantageous in view of the reaction operation and the design of the reaction apparatus.

The reaction temperature is preferred to be from about 80° C. to about 150° C., more preferably 100 to 120° C.

Alkali salts of trialkylacetic acid may be employed within a relatively broad range of 0.05 to 5.0 grams per 100 grams of unreacted hydrocarbons depending upon the reaction condition but the optimum amount can be determined by a simple preliminary test.

The following examples are given for the purpose of illustration of this invention and are not intended as limitations thereof.

EXAMPLE 1

Oxidation of diisopropylbenzene

Into a glass reactor having a diameter of 3.5 cm. and a length of 60 cm. and equipped with a reflux condenser, a thermometer, a gas inlet tube and a sampling tube were charged 300 g. of diisopropylbenzene (abbreviated as DIB hereinafter), 3.0 wt. percent of diisopropylbenzene monohydroperoxide (abbreviated as DIBHP hereinafter) as a reaction initiator and a small amount of an additive as mentioned below and then air was passed through the resulting mixture at a rate of 45 l./hr. under atmospheric pressure while maintaining the reaction temperature at 110° C. The reaction was carried out while sampling at regular intervals and stopped at the time where the hydroperoxide content in the reaction mixture exceeded 30 wt. percent. As the additive, sodium neo-heptanoate, sodium neo-decanoate, sodium neo-tridecanoate and sodium salt of Versatic-9-acid were used. For the comparison, the reaction was carried out using sodium carbonate, calcium carbonate, sodium silicate anhydride, sodium stearate, sodium naphthenate, sodium n-decanoate or sodium pivalate under the same condition as described above. The effects of the additives in the reaction were compared with respect to an average oxidation velocity and a color of the reaction product. The results are shown in the following Table 1.

TABLE 1

| | Additive | Amount of additive used to DIB (wt. percent) | Average oxidation velocity (DIBHP g./hr.) | Color (APHA) |
|---|---|---|---|---|
| Present invention. | Sodium neo-heptanoate | 0.14 | 18.46 | 60 |
| | Sodium neodecanoate | 0.14 | 20.42 | 50 |
| | Sodium salt of Versatic-9-acid | 0.14 | 17.73 | 60 |
| | Sodium neo-tridecanoate | 0.14 | 18.62 | 50 |
| Comparative example. | Sodium carbonate | 0.5 | 9.07 | 100 |
| | Calcium carbonate | 0.5 | 10.32 | 100 |
| | Sodium silicate anhydride | 0.5 | 10.36 | 100 |
| | Sodium stearate | 0.13 | 10.93 | 110 |
| | Sodium naphthenate | 0.13 | 10.51 | 130 |
| | Sodium n-decanoate | 0.14 | 9.02 | 110 |
| | Sodium pivalate | 0.14 | 16.58 | 100 |

EXAMPLE 2

Oxidation of cumene

Into the same reactor as used in Example 1 were charged 300 g. of cumene, 3.0 wt. percent of cumene hydroperoxide (abbreviated as CHP hereinafter) as a reaction initiator and a small amount of an additive as mentioned below, and then air was introduced into the resulting mixture at a rate of 45 l./hr. under atmospheric pressure while maintaining the reaction temperature at 110° C. The reaction was stopped at the time where the hydroperoxide content in the reaction mixture exceeded 27 wt. percent while sampling at regular intervals. As the additive, sodium neo-decanoate, sodium neo-tridecanoate, sodium salt of Versatic-9-acid and sodium salt of Versatic-1519 acid were used.

For the comparison, the reaction was carried out under the same condition as described above except that sodium carbonate, calcium carbonate, sodium stearate, sodium naphthenate, sodium n-decanoate or sodium pivalate was used as the additive. The effects of the additives in the reaction were compared with respect to an average oxidation velocity and color of the reaction product. The results are shown in the following Table 2.

TABLE 2

| | Additive | Amount of additive used to cumene (wt. percent) | Average oxidation velocity (CHP g./hr.) | Color (APHA) |
|---|---|---|---|---|
| Present invention. | Sodium neo-decanoate | 0.14 | 8.5 | 15 |
| | Sodium neo-tridecanoate | 0.14 | 7.7 | 20 |
| | Sodium salt of Versatic-9-acid | 0.14 | 7.4 | 20 |
| | Sodium salt of Versatic-1519-acid | 0.14 | 7.4 | 20 |
| Comparative example. | Sodium carbonate | 0.5 | 4.2 | 70 |
| | Calcium carbonate | 0.5 | 4.7 | 80 |
| | Sodium stearate | 0.13 | 5.4 | 70 |
| | Sodium naphthenate | 0.13 | 5.0 | 70 |
| | Sodium n-decanoate | 0.13 | 4.3 | 70 |
| | Sodium pivalate | 0.14 | 6.7 | 80 |

In the above tables, the average oxidation velocity is determined as follows: For example, in the reaction of the above Examples, the oxidation is carried out until the hydroperoxide content becomes about 30 wt. percent and the correct amount of the resulting hydroperoxide is determined and said amount is divided by the total reaction time from the reaction start to the completion, which value is the average oxidation velocity. From the above Tables 1 and 2, it can be seen that when the above described alkali salts of trialkylacetic acids are used, an extremely higher average oxidation velocity can be attained as compared with the case of the conventional additives. The use of sodium neo-decanoate shows the particularly excellent result. Furthermore, it can be seen that sodium salt of n-decanoic acid, which is an isomer of decanoic acid, does not improve the oxidation velocity. On the other hand, sodium salt of trialkylacetic acid having not more than 6 carbon atoms, for example, sodium pivalate shows a fairly high oxidation velocity but the reaction product is considerably colored and is not preferable. Moreover, it is noteworthy that when sodium salts of trialkylacetic acids are used, the hydroperoxide having such a very light color that a slight coloring is observed, can be obtained until the hydroperoxide content in the reaction mixture exceeds 30 wt. percent. In the conventional direct oxidation process, there is a problem in the coloring of the oxidized product rather than the oxidation velocity, so that the alkali salts of trialkylacetic acids are epoch-making additives.

What is claimed is:

1. In a process of producing tertiary organic hydroperoxides, in which alkyl-substituted aromatic hydrocarbons having the following general formula

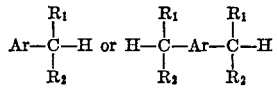

wherein $R_1$ and $R_2$ represent alkyl groups having 1 to 3 carbon atoms, and Ar represents a benzene ring, is oxidized by oxygen or air in a homogeneous liquid phase at a temperature between about 80° and about 150° C. to produce tertiary hydroperoxides having the following general formula

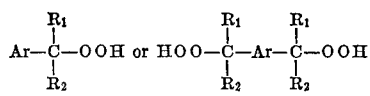

wherein $R_1$, $R_2$ and Ar have the same meanings as described above, the improvement which comprises carrying out said oxidation in the presence of an alkali metal salt of a trialkylacetic acid having 7 to 19 carbon atoms as an additive.

2. The process as defined in claim 1, wherein said alkali metal salt of trialkylacetic acid is a potassium salt or sodium salt of an acid selected from the group consisting of neo-heptanoic acid; neo-decanoinc acid; neo-tridecanoic acid; 2,2,4,4-tetramethyl valeric acid and 2-isopropyl-2,3-dimethylbutyric acid; a mixture of tertiary monobasic fatty acids of from 9 to 11 carbon atoms; and a mixture of multi-branched tertiary monobasic fatty acids of from 15 to 19 carbon atoms.

3. The process as defined in claim 1, wherein said alkali metal salt of trialkylacetic acid is present in an amount between 0.05 gram and 5.0 grams per 100 grams of unreacted hydrocarbons.

4. The process as defined in claim 1, wherein said alkali metal salt of trialkylacetic acid is sodium neo-decanoate.

References Cited

UNITED STATES PATENTS 2,773,906   12/1956   Emerson _____ 260—610 B

FOREIGN PATENTS 571,091   2/1959   Canada _____ 260—610 B
838,029   6/1960   Great Britain _____ 260—610 B
895,622   5/1962   Great Britain _____ 260—610 B BERNARD HELFIN, Primary Examiner W. B. LONE, Assistant Examiner